United States Patent
Sturgis

(10) Patent No.: US 7,366,912 B2
(45) Date of Patent: Apr. 29, 2008

(54) METHOD OF IDENTIFYING PARTICIPANTS IN SECURE WEB SESSIONS

(75) Inventor: Rod D. Sturgis, Pleasant Grove, UT (US)

(73) Assignee: Net Endeavor, Inc., Pleasant Grove, UT (US)

( * ) Notice: Subject to any disclaimer, the term of this patent is extended or adjusted under 35 U.S.C. 154(b) by 788 days.

(21) Appl. No.: 10/789,737

(22) Filed: Feb. 27, 2004

(65) Prior Publication Data

US 2005/0193191 A1  Sep. 1, 2005

(51) Int. Cl.
*H04L 9/32* (2006.01)
*H04L 9/14* (2006.01)
*H04L 9/08* (2006.01)
*H04L 9/16* (2006.01)

(52) U.S. Cl. .................. 713/185; 713/183; 713/171

(58) Field of Classification Search ............... 713/171, 713/183, 185
See application file for complete search history.

(56) References Cited

U.S. PATENT DOCUMENTS 6,879,986 B1 *  4/2005  Fisher .................... 707/101

* cited by examiner

*Primary Examiner*—Gilberto Barron, Jr.
*Assistant Examiner*—Venkat Perungavoor
(74) *Attorney, Agent, or Firm*—Colter Jennings

(57) ABSTRACT

A method and computer product are disclosed that permit the creation of secure invitations containing no sensitive information. The invitations contain encrypted tokens that are received by authorized invitees, thereby providing secure access to a communications session that may involve the exchange of sensitive information. Invitations contain only pointers to information about invitees and the communications session, so that all sensitive information may be retained in a master database on the host server rather than being communicated to the invitee in the invitation. Secure communication sessions may thus be conducted by sending invitations with encrypted tokens to eligible participants without the risk of the information in the tokens being decrypted and used by unauthorized parties to gain access to the secure session, because the tokens contain no information about the invitee or the session.

20 Claims, 5 Drawing Sheets

METHOD OF IDENTIFYING PARTICIPANTS IN SECURE WEB SESSIONS

BACKGROUND

This invention relates to ensuring a secure identification of web survey participants, and particularly to the process of ensuring that a secure communication session over a computer network identifies the correct participants by sending encrypted invitation tokens to those prospective participants.

Computer networks have been a boon to information sharing in modern society and business. Computer users are able to access network resources to obtain and process useful data and to communicate with other computer users. These networks include local area networks, company wide networks, and wide area networks including the vast worldwide web.

In the workplace, computer networks allow companies to receive various types of information from employees, customers, and others quickly and easily. In the past, communication sessions over networks have often required that sensitive information pass over the network. In some situations, this is not problematic, but some network sessions require secure identification of participants because such sessions involve sensitive or proprietary information that a company wishes to protect. Protecting the information passing over the network is costly to the point of being prohibitive, taking the form of expensive security software or hardware devices that verify the identities of a network session's participants.

One of the primary problems is the identifier or "token" that a session participant uses to gain access to the network session. Tokens of this kind have contained information about the participant and the network session, often encrypted to prevent someone from falsifying credentials to gain access to a network session. As long as the token contains information, however, a risk exists that an uninvited third party may be able to create a false token to gain access to a network session and its protected information or may be able to gain or to abstract confidential information from a token. For example, the interception of tokens containing sensitive information could enable an unauthorized user to impersonate an authorized user and gain access to confidential information or input false or misleading information into the system. Thus, companies conducting sensitive network sessions seek methods that allow them to transmit as little information about the session as possible to protect the session's integrity in a cost-effective manner.

SUMMARY

According to the present invention, a method is provided that permits parties conducting a network communication session to send invitations to participate in the communication session, which invitations contain no sensitive information, thereby allowing only the invited participants to access the session without compromising session security. The method permits an organizer of a set of network sessions using a particular application to create tokens that give participants access to the sessions without the risk of a third party decrypting the information in the token to gain unauthorized access to the session and thereby compromising the integrity of the session and the information exchanged therein. This level of security is valuable to individuals and companies that must conduct sessions over a network where sensitive or proprietary information must be shared only by accurately identified participants.

The method of the present invention involves creating encoded tokens that contain no information about the invited participant to whom the token is delivered or the session that the participant is to access. Participants use these tokens to access the proper instance of an application through a network session. Participants may be identified by the application, even though the token used to access the session does not contain any identifying information.

The organizer of a set of high-security network sessions using an application begins the process by creating a master database containing the following information: (1) the identities and related relevant information about designated participants in the session; (2) a collection of arbitrary alphanumeric or binary tokens, each token associated with one designated participant; (3) the designation of the particular session that the participants are to access; (4) a set of keys used to encrypt the invitations; and (5) a set of arbitrary or random pointers, each associated with one encoding key. The alphanumeric tokens all contain a nested checksum, comprising a value in the token that represents the sum of the values in a portion of the token, which portion in turn contains a second checksum representing the sum of a smaller portion of the values within the larger. This nested checksum allows the database to detect any tampering with the token later in the process. After this database has been created, it can be associated with the application that will be used in the network session.

The organizer of the network session then creates an invitation to the network session that is sent to each designated participant via e-mail or another network communication means or the invitation could be communicated in other ways such as a printed memorandum. To create this invitation, the method finds the token associated with that designated participant, including its nested checksum, and encrypts it with a randomly selected key. A pointer associated with this key is added to the encrypted token and the encrypted token and pointer are added to the invitation. The invitation is encoded to conform to the protocols of the network over which the invitation will be received by the participant. The invitation is then delivered to the designated participant.

Each participant gains access to the network session by responding to the invitation through the network by the means established in the invitation. The invitation response returns to the master database, where the key pointer in the invitation is identified and used to find the appropriate key to decrypt the token in the invitation. After the token is decrypted, the method verifies that the nested checksum represents the sum of the overlapping portions of the token. The token is used to find the designated participant to which it is associated, and the participant is given access to the network session. The application used in the session can identify the participant and associate the participant with the relevant information contained in the master database.

When the organizer wishes to conduct another set of network sessions, the encryption keys, pointers, and tokens are not reused. New keys, pointers, and tokens are created for each set of sessions, to ensure that security of identity is maintained.

BRIEF DESCRIPTION OF THE DRAWINGS

Other features and advantages of the present invention will be apparent from reference to the following Detailed Description taken in conjunction with the accompanying Drawings, in which.

DETAILED DESCRIPTION

According to the present invention, a method is provided that permits the creation of encrypted tokens containing no vital information, which tokens are incorporated into invitations sent to selected invitees. The tokens can be redeemed through a computer network, giving only those selected invitees access to communications sessions where sensitive information may be exchanged. The invitations contain only pointers to information about the invitee and the network session, and all sensitive information is kept in a master database. This method permits the organizer of a set of secure network sessions to send invitations to eligible participants without the risk of the information in the tokens contained in the invitations being decrypted and used by third parties.

Figure 1:
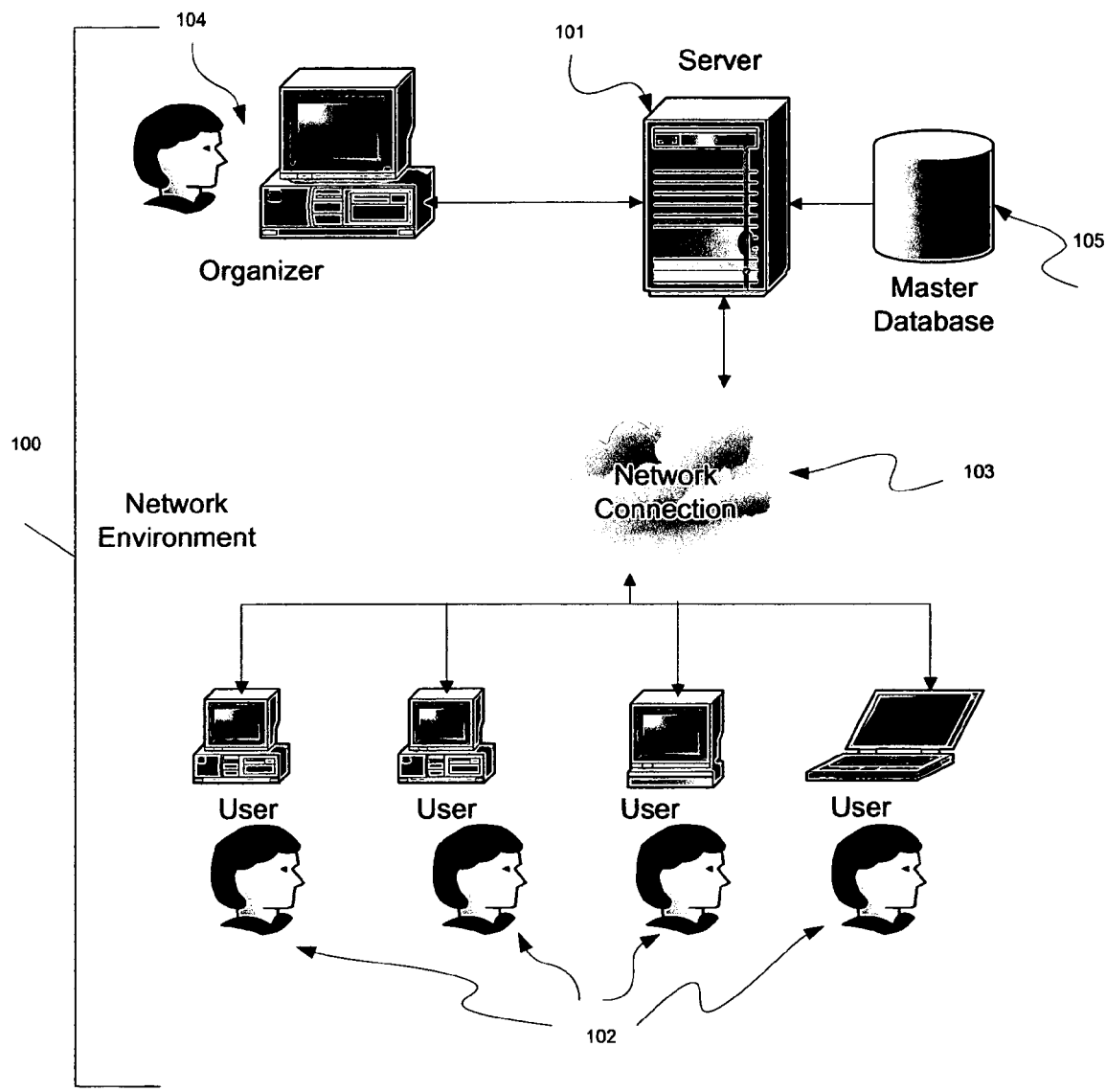
FIG. 1 depicts a typical network environment in which the method of the present invention may operate.

The method of the present invention operates in a typical network environment 100, as depicted in FIG. 1. Network environments 100 useful in the practice of the present invention typically comprise a network server 101 (a computer that will be central in the network session), one or more users 102, which may be human or automated participants (for example, computers or intelligent devices) invited to participate in the network session, and an organizer 104, which may be a human or automated device that invites the users 102 to participate in the network session. The server 101 may also be used by one of the users 102 to access the network session.

Figure 2:
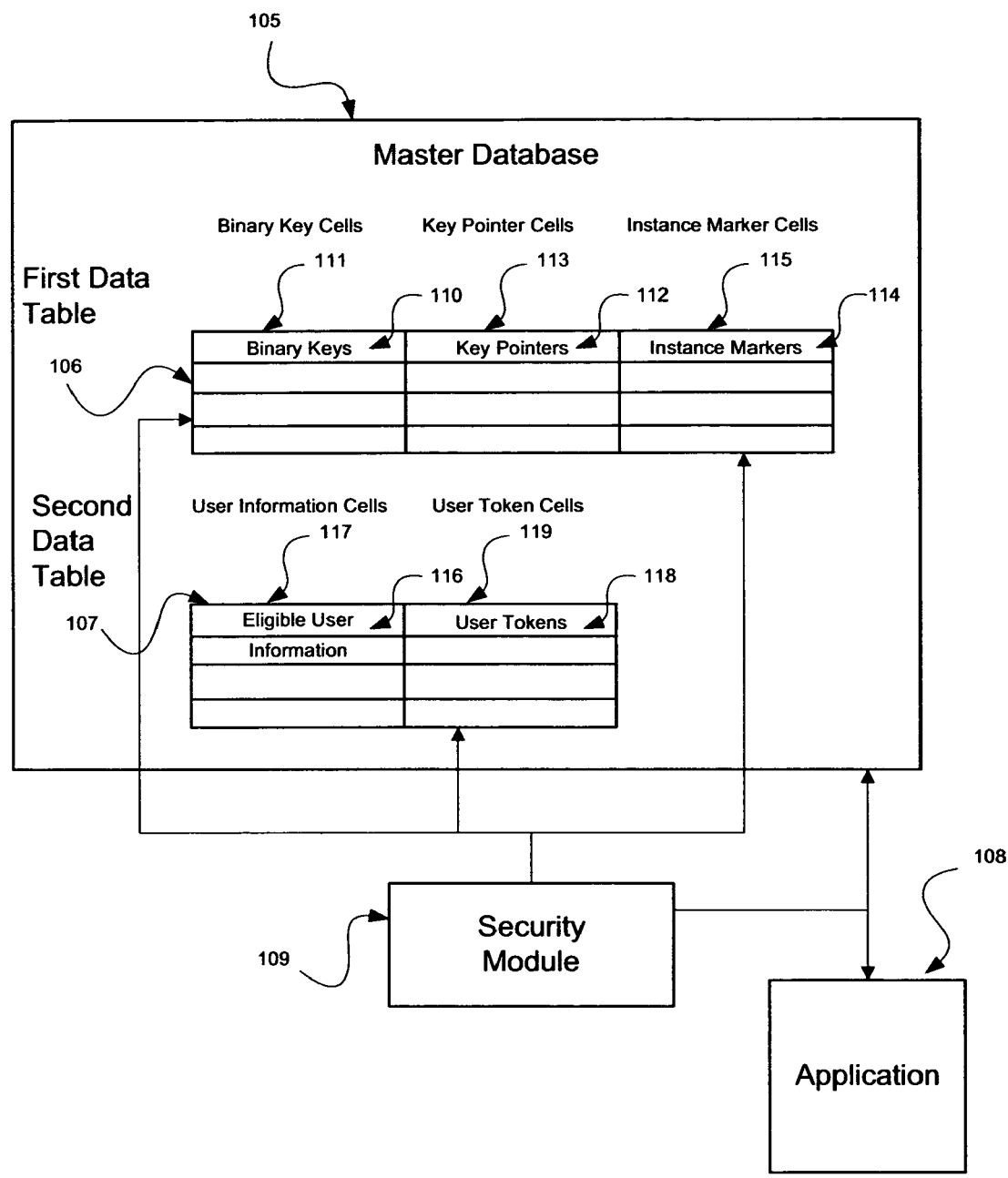
FIG. 2 depicts the process of setting up the master database.

As depicted in FIG. 2, according to the present invention a master database 105 is created on the server 101 by the organizer 104, using an application or other tool, unless an appropriate master database containing all required information 105 already exists on the server 101 from a prior network session. The master database 105 contains two tables, a first table 106 containing three pluralities of cells and a second table 107 containing two pluralities of cells. The master database 105 is then associated with and accessed by an application 108 on the server 101 as is known in the art. The network session is to be conducted using the application 108. These steps of the process are depicted in flowchart form in FIG. 3.

Figure 3:
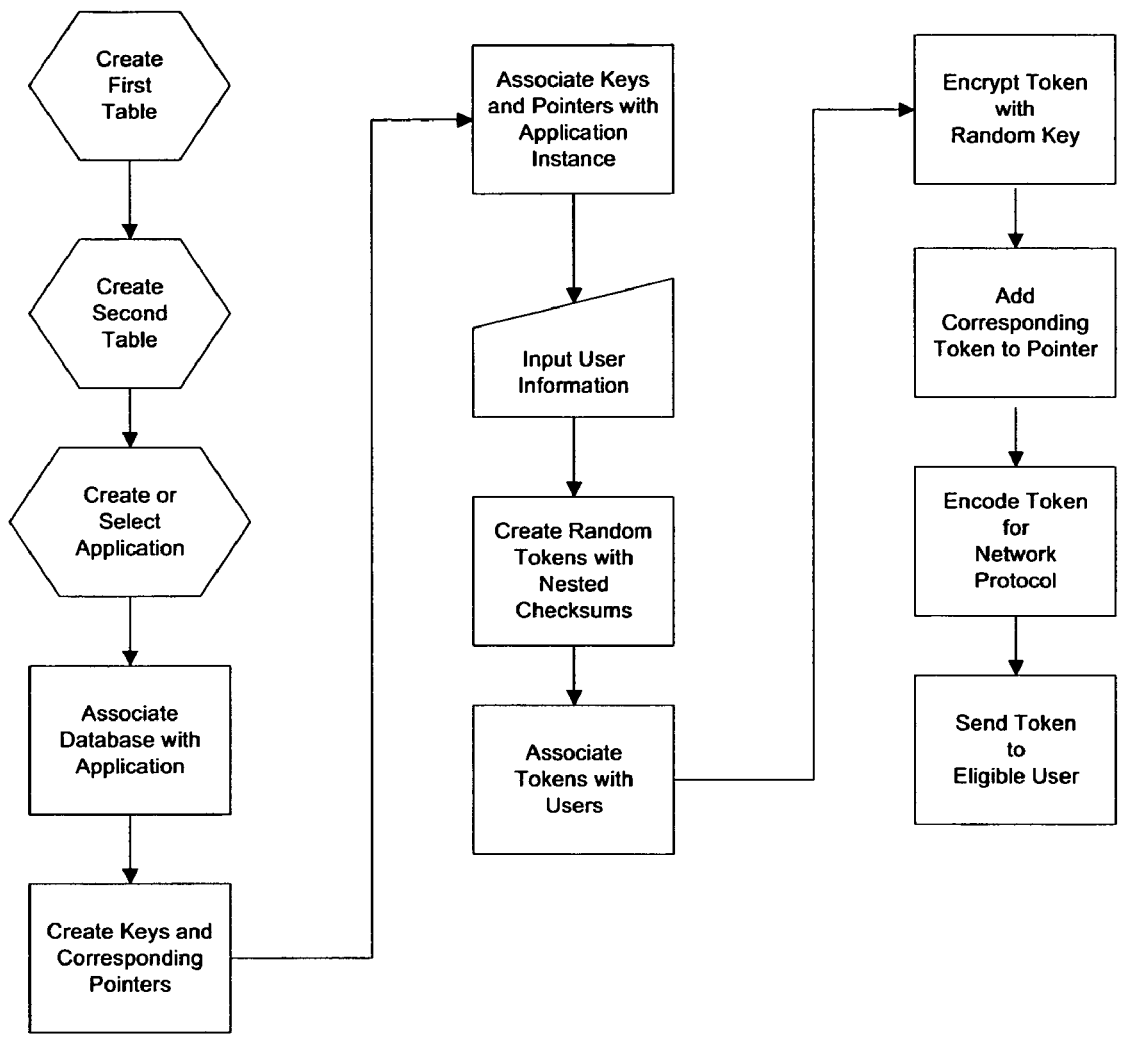
FIG. 3 is a flowchart depicting the process of setting up the master database sending an invitation to a designated participant.

Once the master database 105 has been prepared, the database 105 is populated in a series of steps depicted in FIG. 3. The cells in the first table 106 are populated by a security module 109. The security module 109 is a library of functions, such as a dynamically linked library or DLL. The security module 109 creates a set of binary encryption keys 110. The encryption keys 110 are unique to the set of network sessions to be conducted, and are placed into a plurality of cells containing binary keys cells 111 of the first table 106. The encryption keys 110 are randomly generated and are never transmitted out of the master database 105.

Next, the security module 109 creates a set of key pointers 112. The key pointers 112 are placed into a plurality of key pointer cells 113 of the first table 106, one key pointer 112 is generated and placed into a single key pointer cell 113 for each of the binary encryption keys 110. The key pointers 112 are also randomly generated and are of sufficient length to be statistically globally unique. Next, the security module 109 places a set of instance markers 114 into a plurality of instance marker cells 115 in the first table 106. The instance markers 114 marking the instance of the application 108 for which the binary keys 110 and key pointers 112 are to be used. This allows the master database 105 to conduct multiple network sessions using the same database without reusing any of the binary encryption keys 110.

The organizer 104 populates the second table 107 of the master database 105 with information about the eligible participants related to the network session. Each eligible user's information 116 is placed into a plurality of eligible user information cells 117 in the second table 107. The eligible users' information 116 includes all data on the eligible participants that the organizer 104 needs to associate each user network session with the appropriate network sessions for the user for each instance of a network communications session.

The security module 109 then creates a set of random user tokens 118 and places them into a plurality of user token cells 119 in the second table 107, one user token for each of the eligible user information 116 entries. The user tokens 118 are cryptographically random and contain a nested checksum 120, a value in the token that represents the sum of the values in a portion of the token, which portion in turn contains a checksum representing the sum of a smaller portion of the values within the larger. After the security module 109 populates the master database 105, the first table 106 and the second table 107, and then associates the tables with an application, the security module 109 creates an invitation 121 for the eligible participants. As created, the invitation transmitted to the user comprises an unencrypted key pointer and an internal user token encrypted using the binary key and that includes a checksum for validation.

Figure 4:
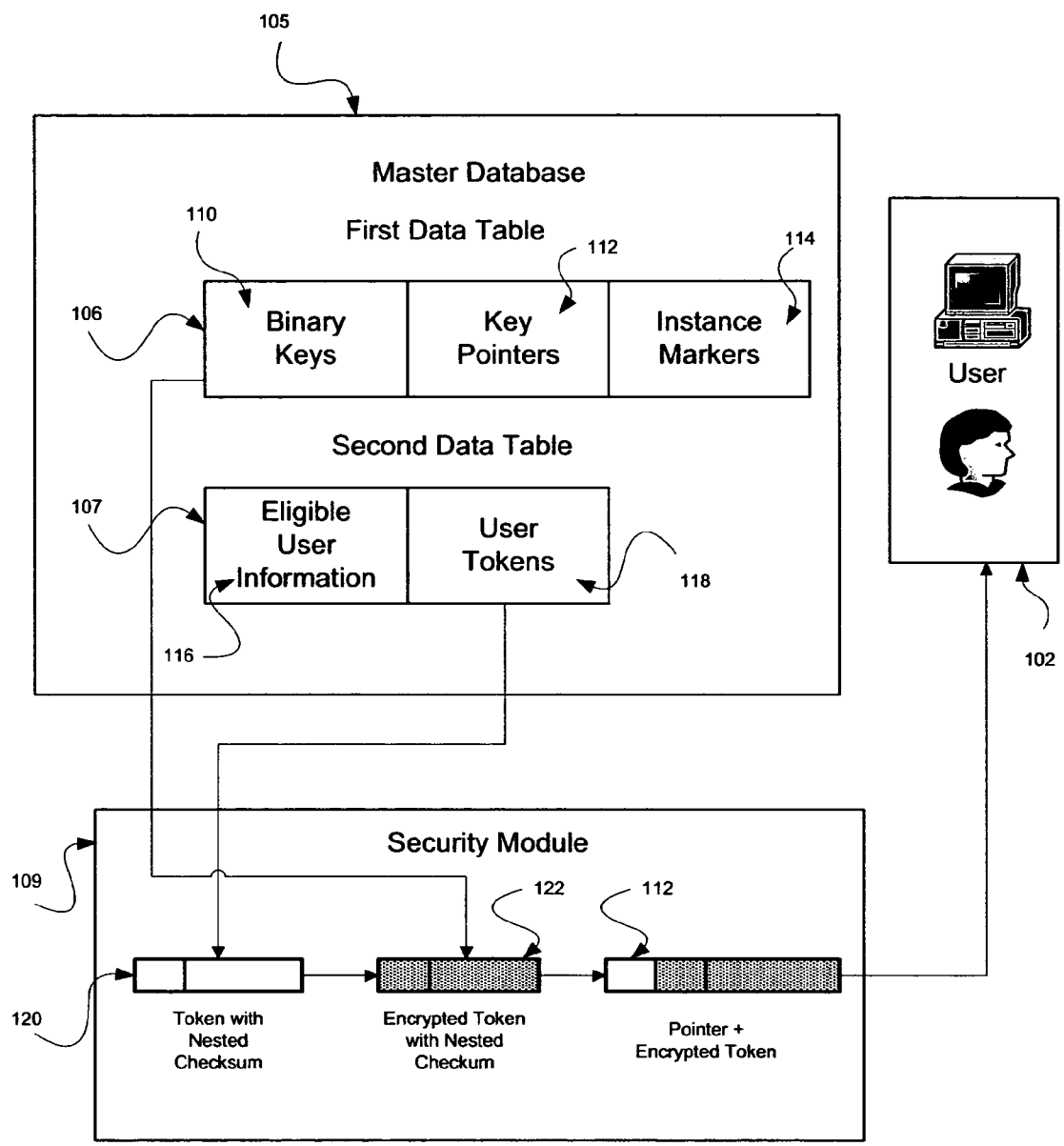
FIG. 4 depicts the process of sending an invitation to a designated participant.

As depicted in FIG. 4 and in the flowchart in FIG. 3, several steps are required to create an encrypted token 122 that can be delivered to an eligible participant in the network sessions. First, the security module 109 takes one of the user tokens 118, including its nested checksum 120, from the key pointer cells 113 in the second table 107 and encrypts the token 118 with a randomly selected one of the binary keys 110 in the binary keys cells 111 of the first table 106. The security module 109 adds the key pointer 112 associated with the binary key 110 that was used to encrypt the token to the encrypted user token, creating the full encrypted token 122 for the invitation 121. The security module 109 then encodes this encrypted token for the appropriate network protocols so that it can be redeemed through the network environment 100 on which the network session is to be conducted. After this, the token is delivered to the appropriate eligible participant, or user 102, by a means chosen by the session's organizer 104.

Figure 5:
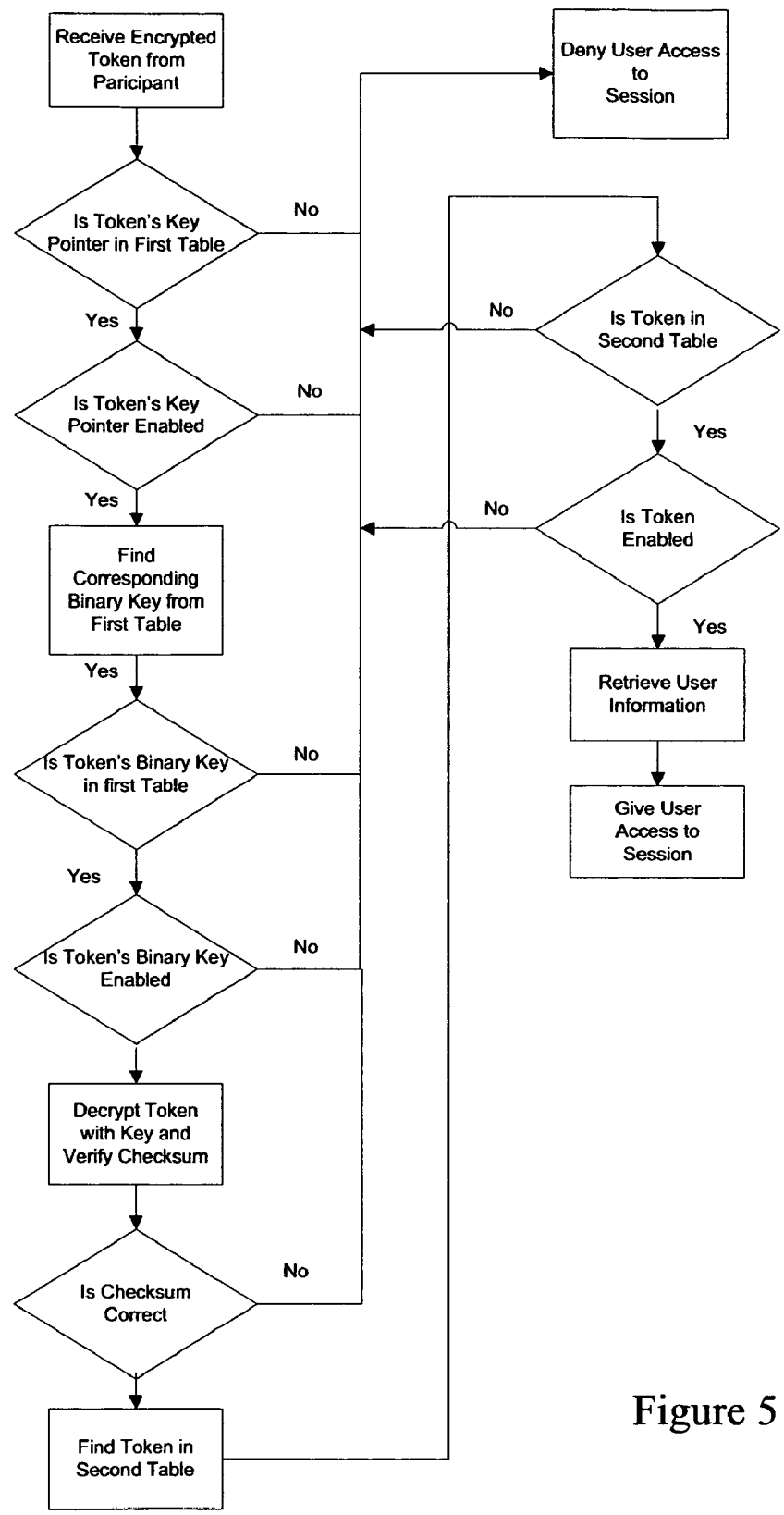
FIG. 5 is a flowchart of the invitation redemption process.

As depicted in the flowchart found in FIG. 5, after receiving the invitation 121, an eligible participant, or user 102, may redeem the invitation 121 to gain access to the network session. The user 102 sends the encrypted token 122 through the network connection 103 in the network environment 100 to the application 108 on the server 101. The application 108 sends the encrypted token 122 to the security module 109 for decryption and validation. Upon receipt of the encrypted token 122 from the application 108, the security module 109 locates the key pointer 112 that the token contains. The security module 109 then compares this key pointer 112 with the key pointer 112 in the key pointer cells 113 of the first table 106. If the key pointer 112 is not found in the first table 106 or has been marked as disabled, then the security module 109 denies the user 102 access to the network session. A key pointer may be marked as disabled when the time for session expires, if a reminder invitation is generated and sent, by administrator request, or for any other reason that may arise.

If the security module 109 finds the key pointer 112 in the key pointer cells 113 of the first table 106, the security module 109 finds the binary key 110 associated with this key pointer 112 in the binary key cells in the first table 106. If the binary key 110 is not found in the first table 106 or has been marked as disabled, then the security module 109 denies the user 102 access to the network session. If the security module 109 finds the binary key 110, then the security module 109 uses this key to decrypt the user token 118 in the encrypted token 121.

As depicted in FIG. 5, after the user token 118 has been decrypted, the security module 109 verifies the value of the nested checksum 120. If the value of the checksum 120 is not correct, the security module denies the user 102 access to the network session. If the value of the checksum 120 is correct, the security module 109 finds the user token 118 in the user token cells 119 of the second table 107. If the security module 109 does not find the user token 118 in the user token cells 119 of the second table 107 or if that user token 118 is marked as disabled, the user 102 is denied access to the network session. If the security module 109 finds the user token 118 in the user token cells 119 of the second table 107, the security module 109 retrieves the eligible user information 116 associated with the user token 118 from the eligible user information cells 117 in the second table 107, and the security module 109 sends the eligible user information 116 to the application 108, verifying the identity of the user 102 and giving the user 102 access to the network session.

If, at any point in the process, a third party were to decrypt the encrypted token 122, the decrypted token would only contain pointers that have no meaning outside the context and content of the master database. For a third party to identify or gain relevant information from the tokens, the third party would have to gain access to the master database because the method does not allow for the creation of falsified tokens.

Physical and network security precautions should be implemented in order to prevent a third party from simply receiving and replying to an invitation 121 sent to an eligible user 102. If, however, at any point in the process, a third party were to take the invitation 121 of a user 102 and redeem it through the network environment 100, this invitation 121 would be processed by the security module 109. If the user had already redeemed the invitation 121, then the security module 109 would not allow the third party to access the network session because the eligible user information 116 for the user 102 would show that the invitation 121 of that user 102 had already been redeemed. If the user 102 had not already redeemed the invitation 121, then the third party would be able to gain access to the network session and application 108. However, when the user 102 later attempted to redeem the same invitation, the security module 109 would not allow the user 102 to access the network session because the eligible user information 116 for that user 102 would show that the invitation 121 of that user 102 had already been redeemed. Then the user 102 would report this occurrence to the organizer 104, who would cancel the network session of the third party, including all information provided to the application 108 by the third party, and allow the user 102 to redeem the invitation 121.

The method of the present invention allows a company or individual conducting a set of high-security network sessions, in which sensitive information is to be collected or exchanged, to send secure invitations to participants without sending any sensitive information concerning the users or the session. The invitations to participate in the network sessions may be redeemed by participants through a computer network, and all information required about the user and session is kept inside the master database to which the invitation is sent, allowing the sessions' organizer to prevent unwanted dissemination of any of this information through the invitation-sending process. Thus, the present invention has several advantages over the prior art. Although embodiments of the present invention have been described, various modifications and changes may be made by those skilled in the art without departing from the spirit and scope of the invention.

The invention claimed is:

1. A method of identifying a user participating in a network communication session comprising the steps of:

creating a master database having a first table with a first plurality of cells for a set of binary keys, a second plurality of cells for a plurality of key pointers, and third plurality of cells for markers identifying an instance of an application;

creating a second table in the master database with a first plurality of cells for information related to eligible users and a second plurality of cells for user-associated tokens;

creating an application to be accessed by eligible users over a communications network;

associating the master database with the application to be accessed by the eligible users identified in a second table of the master database;

generating a plurality of binary key pointers and a plurality of binary keys of a predetermined length and associating each binary pointer with a unique one of the binary keys;

associating the key pointers with a first instance of the application;

entering information relating to the eligible users for the first instance into the first plurality of cells in the second table;

generating a plurality of tokens wherein each token contains a nested checksum;

associating each eligible user with a unique one of the tokens from the plurality of tokens by placing the associated token in a position in the second plurality of cells in the second table corresponding to the eligible user in the first plurality of cells in the second table;

encrypting each user-associated token with a randomly selected one of the plurality of binary keys;

prepending each encrypted token with the key pointer associated with the binary key used to encrypt the token;

providing the combined key pointer and encrypted token to the associated eligible user;

receiving the combined key pointer and encrypted token returned by a user through the communications network;

finding the key pointer in the second plurality of cells of the first table;

retrieving the corresponding binary key from the first plurality of cells in the first table if the key pointer is found in the second plurality of cells of the first table and the key pointer received is not marked as disabled;

decrypting the encrypted token sent by the user using the retrieved binary key from the first plurality of cells of the first table if the binary key is found in the first plurality of cells in the first table and the binary key is not marked as disabled;

retrieving the corresponding information relating to the eligible user from the first plurality of cells in the second table if the token is found in the second plurality of cells of the second table and the token is not marked as disabled; and using this information to give the eligible user access to the corresponding instance of the application.

2. The method of claim 1 further comprising the step of encoding the combined key pointer and encrypted token to conform to the protocols of the communications network.

3. The method of claim 1 wherein the binary key pointers are cryptographically random.

4. The method of claim 1 wherein the tokens are cryptographically random.

5. The method of claim 1 further comprising the step of denying access to the user if the key pointer received cannot be found in the second plurality of cells of the first table or the key pointer received is marked as disabled.

6. The method of claim 1 further comprising the step of denying access if the binary key is not found in the first plurality of cells of the first table or the binary key is marked as disabled.

7. The method of claim 1 further comprising the step of verifying that the nested checksum in the decrypted token contains the values corresponding to the algorithm by which it was generated.

8. The method of claim 7 further comprising the step of denying access to the user if the values contained in the nested checksum are not correct.

9. The method of claim 7 further comprising the step of finding the decrypted token in the second plurality of cells of the second table if the nested checksum is correct.

10. The method of claim 7 further comprising the step of denying access to the user if the token is not found in the second plurality of cells in the second table or the token is marked as disabled.

11. A method of identifying a user participating in a network communication session comprising the steps of:
creating a master database having a first table with a first plurality of cells for a set of binary keys, a second plurality of cells for a plurality of key pointers, and third plurality of cells for markers identifying an instance of an application;
creating a second table in the master database with a first plurality of cells for information related to eligible users and a second plurality of cells for user-associated tokens;
creating an application to be accessed by eligible users over a communications network;
associating the master database with the application to be accessed by the eligible users identified in a second table of the master database;
generating a plurality of binary key pointers and a plurality of binary keys of a predetermined length and associating each binary pointer with a unique one of the binary keys;
associating the key pointers with a first instance of the application;
entering information relating to the eligible users for the first instance into the first plurality of cells in the second table;
generating a plurality of tokens wherein each token contains a nested checksum;
associating each eligible user with a unique one of the tokens from the plurality of tokens by placing the associated token in a position in the second plurality of cells in the second table corresponding to the eligible user in the first plurality of cells in the second table;
encrypting each user-associated token with a randomly selected one of the plurality of binary keys;
prepending each encrypted token with the key pointer associated with the binary key used to encrypt the token;
providing the combined key pointer and encrypted token to the associated eligible user;
receiving the combined key pointer and encrypted token returned by a user through the communications network;
finding the key pointer in the second plurality of cells of the first table;
retrieving the corresponding binary key from the first plurality of cells in the first table if the key pointer is found in the second plurality of cells of the first table and the key pointer received is not marked as disabled;
decrypting the encrypted token sent by the user using the retrieved binary key from the first plurality of cells of the first table if the binary key is found in the first plurality of cells in the first table and the binary key is not marked as disabled;
verifying that the nested checksum in the decrypted token contains the values corresponding to the algorithm by which it was generated;
retrieving the corresponding information relating to the eligible user from the first plurality of cells in the second table if the token is found in the second plurality of cells of the second table and the token is not marked as disabled; and
using this information to give the eligible user access to the corresponding instance of the application.

12. The method of claim 11 further comprising the step of encoding the combined key pointer and encrypted token to conform to the protocols of the communications network.

13. The method of claim 11 wherein the binary key pointers are cryptographically random.

14. The method of claim 11 herein the tokens are cryptographically random.

15. The method of claim 11 herein each of the tokens contains a nested checksum.

16. The method of claim 11 further comprising the step of denying access to the user if the key pointer received cannot be found in the second plurality of cells of the first table or the key pointer received is marked as disabled.

17. The method of claim 11 further comprising the step of denying access if the binary key is not found in the first plurality of cells of the first table or the binary key is marked as disabled.

18. The method of claim 11 further comprising the step of denying access to the user if the values contained in the nested checksum are not correct.

19. The method of claim 18 further comprising the step of finding the decrypted token in the second plurality of cells of the second table if the nested checksum is correct.

20. The method of claim 19 further comprising the step of denying access to the user if the token is not found in the second plurality of cells in the second table or the token is marked as disabled.

* * * * *